US007469406B2

(12) United States Patent
Barros

(10) Patent No.: US 7,469,406 B2
(45) Date of Patent: Dec. 23, 2008

(54) PROCESS SUSPENSION THROUGH PROCESS MODEL DESIGN

(75) Inventor: Alistair P. Barros, Camira (AU)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 11/496,700

(22) Filed: Jul. 31, 2006

(65) Prior Publication Data

US 2008/0127044 A1 May 29, 2008

(51) Int. Cl.
*G06F 9/46* (2006.01)
*G06F 3/00* (2006.01)

(52) U.S. Cl. ...................... 718/100; 719/310

(58) Field of Classification Search .............. 719/310; 710/48; 718/100

See application file for complete search history.

(56) References Cited

U.S. PATENT DOCUMENTS

| 4,912,628 | A | * | 3/1990 | Briggs | 718/100 |
|---|---|---|---|---|---|
| 5,225,978 | A | * | 7/1993 | Petersen et al. | 705/33 |
| 5,812,811 | A | * | 9/1998 | Dubey et al. | 712/216 |
| 5,917,489 | A | * | 6/1999 | Thurlow et al. | 715/809 |
| 6,480,876 | B2 | * | 11/2002 | Rehg et al. | 718/100 |
| 6,662,359 | B1 | * | 12/2003 | Berry et al. | 717/130 |
| 2004/0254945 | A1 | | 12/2004 | Schmidt et al. | |
| 2005/0060706 | A1 | * | 3/2005 | Doyon et al. | 718/100 |

OTHER PUBLICATIONS

Waardenburg, M et al., "Workflow Management in an Internet environment", ZDNET; .axxerion.com/download.axxerion-workflow.pdf, (May 11, 2004), pp. 1-13.

Russell, Nick et al., "Workflow Exception Patterns", CAISE 2006—18th Conference on Advanced Information Systems Engineering Lecture Notes in Computer Science: LNCS, Springer Verlag, BE, vol. 4001, (Jun. 8, 2006), pp. 288-302.

"Final Programme of Events", CAISE 2006—18th Conference on Advanced Information Systems Engineering 2006, .tudor.lu/SI/Presentation.nsf/0/7be78d85e89742fbc125713300566203/$FILE/Caise_programme_final2.pdf, (Jun. 2006), pp. 2-21.

"Databases Toolkit", ZDNET; whitepapers.zdnet.co.uk/0,1000000652,260158541p,00.htm?dl=1, (2004).

Mourao, H et al., "Exception Handling Through a Workflow", Lecture Notes in Computer Science, vol. 3290, (2004), pp. 37-54.

"Workflow Management Coalition Terminology & Glossary", Workflow Management Coalition Specification, vol. WFMC-TC-1011, Issue 3.0, (Feb. 1999).

(Continued)

*Primary Examiner*—Li B Zhen
*Assistant Examiner*—Lechi Truong
(74) *Attorney, Agent, or Firm*—Brake Hughes Bellermann LLP

(57) ABSTRACT

Various implementations are disclosed for designing a process model that includes a task, the task associated with a potential suspension, e.g., in response to an error or other exception. At least one suspension task may be provided in parallel with the task to form a parallel combination thereof within the process model. A first control task, e.g., an AND split task, may be provided prior to the parallel combination, and a second control task, e.g., a synchronize/merge task, may be provided subsequent to the parallel combination, the first control task and the second control task configured to activate and join, respectively, the task and the at least one suspension task during execution of the process model.

15 Claims, 8 Drawing Sheets

OTHER PUBLICATIONS

Hollingsworth, David "The Workflow Reference Model", Workflow Management Coalition Specification, vol. TC00-1003, Issue 1.1, (Jan. 19, 1995), pp. 1-55.

EP Search Report for EP Patent Application No. 07010388.2, mailed Feb. 27, 2008.

Russell, N. et al., "Workflow Control-Flow Patterns : A Revised View", BPM Center Report BPM-06-22, BPMcenter.org, (2006).

Van Der Aalst, W.M.P. et al., "Workflow Patterns", Distributed and Parallel Databases, 14(3), (Jul. 2003), pp. 5-51.

Russell, N. et al., "Workflow Data Patterns", QUT Technical report, FIT-TR-2004-01, Queensland University of Technology, Brisbane, (2004).

Russell, N. et al., "Exception Handling Patterns in Process-Aware Information Systems", BPM Center Report BPM-06-04, BPMcenter. org, (2006).

Barros, A. et al., "Service Interaction Patterns: Towards a Reference Framework for Service-based Business Process Interconnection", Technical Report FIT-TR-2005-02, Faculty of Information Technology, Queensland University of Technology, Brisbane, Australia, (Mar. 2005).

Little, M.C. et al., "An Examination of the Transition of the Arjuna Distributed Transaction Processing Software from Research to Products", Proceedings of the 2nd Conference on Industrial Experiences with Systems Software, vol. 2, (2002).

Jennings, N.R. et al., "Autonomous Agents for Business Process Management", Applied Artificial Intelligence, 14:145-189, (2000).

Yan, Jun et al., "A Service Workflow Management Framework Based on Peer-to-Peer and Agent Technologies", Proceedings of the Fifth International Conference on Quality Software, (2005), pp. 373-382.

Oasis Standard, "Web Services Business Process Excecution Language Version 2.0", wsbpel-v2.0-OS, (Apr. 11, 2007).

Barros, Alistair et al., "Service Interaction Patterns", Proceedings of the 3rd International Conference on Business Process Management (BPM 2005), vol. 3649 of Lecture Notes in Computer Science. Springer-Verlag, (2005), pp. 302-318.

Russell, Nick et al., "Workflow Resource Patterns", BETA Working Paper Series, WP 127, Eindhoven University of Technology, Eindhoven, (2004).

\* cited by examiner

PROCESS SUSPENSION THROUGH PROCESS MODEL DESIGN

TECHNICAL FIELD

This description relates to process models.

BACKGROUND

Modeling languages may be used as meta-languages to describe and execute underlying processes, such as business processes. For example, process modeling languages allow an enterprise to describe tasks of a process, and to automate performance of those tasks in a desired order to achieve a desired result. For instance, the enterprise may implement a number of business software applications, and process modeling may allow coordination of functionalities of these applications, including communications (e.g., messages) between the applications, to achieve a desired result. Further, such process modeling generally relies on language that is common to, and/or interoperable with, many types of software applications and/or development platforms. As a result, for example, process modeling may be used to provide integration of business applications both within and across enterprise organizations.

Thus, such modeling languages allow a flow of activities to be graphically captured and executed, thereby enabling resources responsible for the activities to be coordinated efficiently and effectively. The flow of work in a process is captured through routing (e.g., control flow) constructs, which allow the tasks in the process model to be arranged into the required execution order through sequencing, choices (e.g., decision points allowing alternative branches), parallelism (e.g., tasks running in different branches which execute concurrently), iteration (e.g., looping in branches) and synchronization (e.g., the coming together of different branches).

During execution of process models, it may be necessary or helpful to halt or suspend the execution, and to re-start or resume the execution at a later time. For example, an error or other exception may occur during execution of the process model (e.g., hardware or software malfunctions, or a business-related exception such as a delay in arrival of an expected shipment). If the exception may be temporary, then it may be premature or unnecessary to abort the execution of the entire process model. For example, if the exception is later overcome (such as when the delayed shipment arrives), then it may be possible to proceed with the execution of the process model.

It is possible to perform a system-level suspension of an executing process model, and even to change the process model during the suspension to attempt to overcome the exception. However, such suspension techniques may require extensions to an orchestration (execution) engine of the process model that may be difficult or problematic, and that may have unintended consequences on the process model (upon resumption thereof), and on other (related) process models. Moreover, it may be difficult to re-start a process from the point of suspension, so that a re-set of the process from an earlier point, or from the beginning, may be required.

SUMMARY

According to one general aspect, a task of a process model is determined, the task associated with a potential suspension. At least one suspension task is provided in parallel with the task to form a parallel combination thereof within the process model. A first control task is provided prior to the parallel combination, and is configured to activate the task and the at least one suspension task during execution of the process model. A second control task is provided subsequent to the parallel combination and is configured to join results of the task and the at least one suspension task during execution of the process model.

According to another general aspect, a system includes a process logic generator configured to provide a suspension block within a process model during a design of the process model. The suspension block includes a first control task and a second control task, and also includes a parallel combination of a process branch and a suspension branch between the first control task and the second control task. The suspension branch includes an-isolated task that is configured to activate during an execution of the process model in response to a detection of an exception in a process task of the process branch, and is configured, once activated, to run to completion without permitting interleaving of the process task.

According to another general aspect, a system includes an orchestration engine configured to execute a process model, the orchestration engine being further configured to activate a first control task associated with a process branch and a suspension branch, detect an exception at an exception detection task of the suspension branch, activate an isolated task that is configured, once activated, to execute to completion without interleaving with a task of the process branch, and activate a second control task that is configured to synchronize and merge the process branch and the suspension branch, upon completion of the isolated task.

The details of one or more implementations are set forth in the accompanying drawings and the description below. Other features will be apparent from the description and drawings, and from the claims.

DETAILED DESCRIPTION

Figure 1:
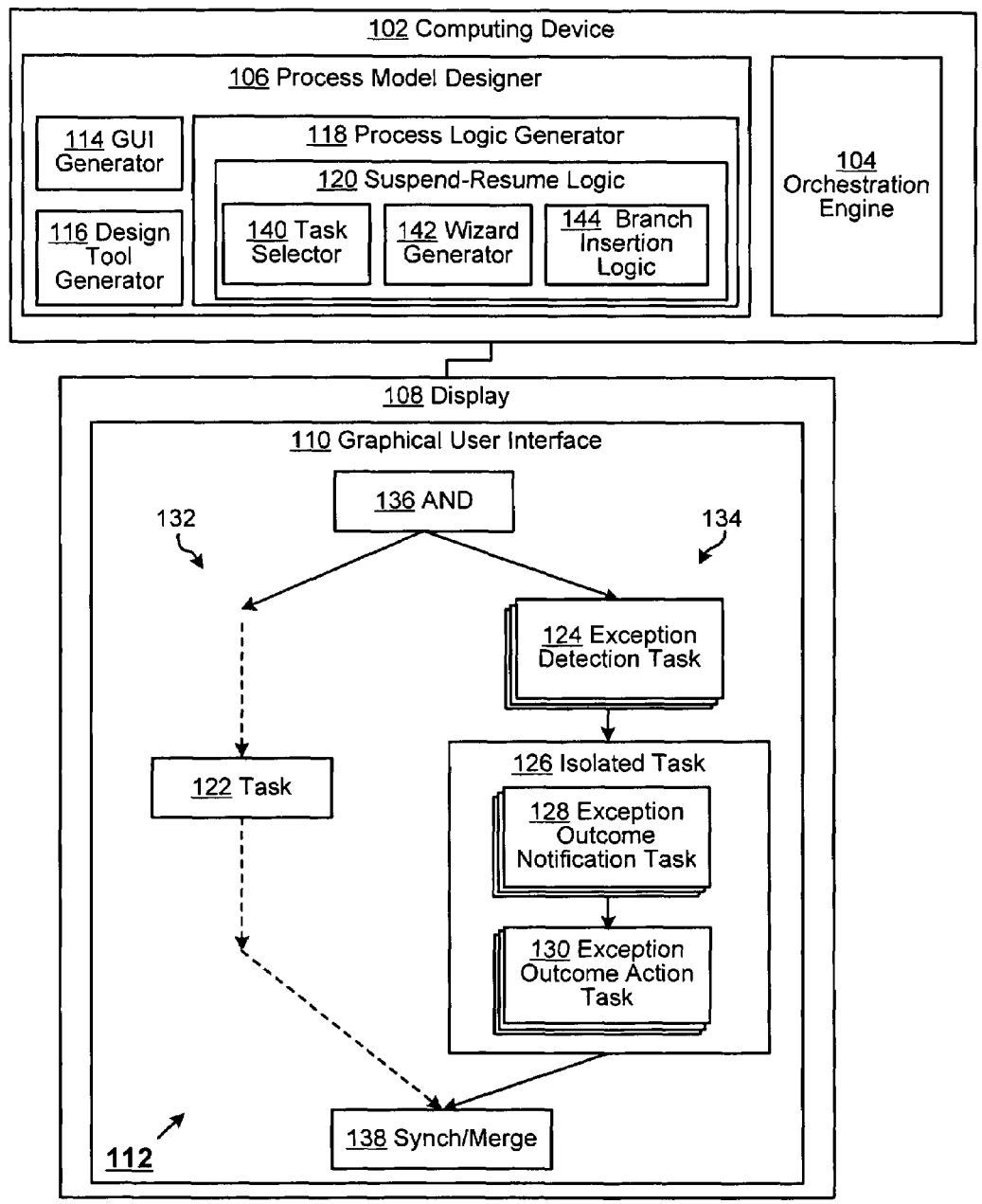
FIG. 1 is a block diagram of a system for implementing process suspension using process model design.

FIG. 1 is a block diagram of a system 100 for implementing process suspension using process model design. In the example of FIG. 1, process models may be designed to include the possibility of suspending one or more specified tasks thereof, so that the suspension may later occur as a normal part of execution of the process model. In other words, actions taken during design-time with regard to constructing the process model may be reflected during run-time, so that execution during run-time may proceed without requiring any external modification or manipulation of the executing process.

In FIG. 1, then, one or more computing device(s) 102 is/are used to implement an orchestration engine 104. The computing device 102 may represent, for example, virtually any computing device having sufficient memory, processing power, and networking ability to execute workflow model design and implementation. Specifically, the computing device 102 may include an enterprise application server that is configured to implement the orchestration engine 104, where the orchestration engine 104 represents an engine for executing process models, and, as such, is configured, for example, to track a state of the process model (e.g., which tasks have been completed, including a most-recently completed task), update the process model in response to a completed task, and ensure that an order of the process model is followed. Languages exist that may be used to specify process models for execution by the orchestration engine 104. For example, the Business Process Execution Language (BPEL) is designed to implement process models that rely on services to realize process tasks. Thus, in some example implementations, BPEL or other such languages, or modifications/extensions thereof, may be used to define and execute the process model(s) implemented by the orchestration engine 104.

The computing device 102 is also configured to implement a process model designer 106. The process model designer 106 may include software running on the computing device 102 that allows a human designer of the process model(s) to design a process model in a convenient manner, without requiring much, if any, programming knowledge on the part of the human designer.

For example, the process model designer 106 may interact with a display 108 to provide a graphical user interface (GUI) 110, so that the designer may design a process model simply by selecting (e.g., dragging-and-dropping) from a toolkit of provided tools and/or templates. For example, the process model designer 106 may provide, using the GUI 110, various graphical elements (e.g., blocks, shapes, arrows, or pointers) that represent various elements of process models. Such elements of process models may include, for example, workflow tasks and associated control tasks for directing a flow of the workflow tasks (where such control tasks may include, for example, forks/splits and associated joins, or pointers to provide a loop or iteration of the process model, or other known elements of process model design). Accordingly, the designer may easily select desired graphical elements, arrange the graphical elements in a desired order, and assign the graphical elements a desired function(s).

In general, various details and variations of such graphical design of process model(s) are known, and further examples are provided below with respect to FIG. 3. Further, as will be appreciated, the display 108 may represent virtually any display suitable for interacting with the computing device 102, while the GUI 110 may represent virtually any suitable GUI, such as, for example, a browser that provides the designer with access to the process model designer 106 over a network (e.g., the Internet, or a corporate Intranet).

In FIG. 1, the process model designer 106 is illustrated as being used to design a suspension block 112 that is a portion of a designed process model. As referenced above, and described in more detail below, the suspension block 112 may be designed during design-time so that a suspension and resumption of some or all of the larger process model (of which the suspension block 112 is a part) may occur during run-time as a normal part of execution thereof by the orchestration engine 104. In other words, for example, the suspension block 112 is designed to anticipate that an exception (e.g., hardware, software, or human error) may occur during execution of the process model by the orchestration engine 104, so that the exception is handled as a normal part of the execution, without modification or manipulation of the orchestration engine 104 during run-time.

In more detail, then, the process model designer 106 may include a GUI generator 114 that is configured to generate or provide the GUI 110. For example, when the GUI 110 includes a browser, the GUI generator 114 may be configured to execute general browser control and/or browser logic. For example, browser controls may generally represent controls that are not specific to any particular page or other content currently being displayed such as, for example, a menu bar, a tool bar, a back button, a forward button, and other common buttons and other controls typically associated with browser usage. Meanwhile, browser logic generally represents software that controls a manner in which the GUI 110 operates and responds to the browser controls just described, and may be responsible, for example, for opening new pages, creating new windows, applying user preferences, or any other task that may be initiated by the designer during process model design. The GUI generator 114 may operate locally to the designer, or may operate in whole or in part at a remote location, e.g., may run on a remote server.

The process model designer 106 also may include a design tool generator 116. As referenced above, such design tools may include various boxes or other shapes, as well as arrows, pointers, or other control elements, that the designer may use to construct a desired process model. Thus, the design tool generator 116 may be configured to provide such graphical elements, and to enforce the necessary properties thereof (e.g., may prevent certain elements from being joined if impermissible, or may automatically generate a secondary element that is required when a particular primary element is selected or used). As will be appreciated, the design tool generator 116 may be implemented as a part of the GUI generator 114, but is shown separately in FIG. 1 for clarity and convenience.

The process model designer 106 also includes a process logic generator 118, which is configured to enforce certain rules on the process model being designed. That is, whereas the design tool generator 116 is associated with graphical elements that are generic to virtually any process model being designed, the process logic generator 118 may generally be associated with logic that is specific to the particular process model being designed, or to a class of process models. For example, if the process model being designed relates to a sales scenario in which (a) orders are received, (b) products are obtained, and (c) shipment occurs, then the process logic generator 118 may ensure that no shipment is scheduled before an associated product is actually obtained (e.g., received in a warehouse for packaging). In this example, such rules may be enforced across a wide range of order/shipping scenarios, while in other scenarios, rules may be very specific to a particular situation.

It should be understood that the process model designer 106 is intended merely to represent and illustrate examples of certain aspects and features that may be relevant to the present description. Of course, many other process model design techniques may additionally or alternatively be used, and many other implementations are contemplated. For example, the process model designer 106 may be implemented as part of the orchestration engine 104, and the process logic generator 118 may be part of, or in communication with, one or more business applications (not shown) that provide, or are associated with, the logic enforced by the process logic generator 118.

In FIG. 1, the process logic generator 118 includes suspend-resume logic 120. As referenced above, and described in more detail below, the suspend-resume logic 120 may be configured to modify a process model being designed to ensure that the designed process model may be suspended during later execution thereof by the orchestration engine 104, as needed and without requiring human intervention and/or modification/manipulation of the orchestration engine 104.

The suspend-resume logic 120 also may be configured to interact with the designer to obtain and implement desired characteristics of the suspension and/or resumption. For example, the suspend-resume logic 120 may obtain information from the designer (perhaps using an interactive wizard) regarding potential causes of the suspension, as well as regarding potential causes of the resumption.

In this way, for example, the designer may design a process model that anticipates that certain errors or other exceptions may occur, and that includes built-in responses to such exceptions. For example, the designer may design a process model that anticipates that an anticipated message (e.g., from a collaborating business partner) may not be received, so that execution of the process model may be suspended until the message is received (whereupon resumption of the process may occur). Such suspensions and resumptions may be designed to occur without disrupting or halting other parts of the larger process model(s) that should be allowed to continue (i.e., that are not directly affected by the exception).

In operation, then, it may occur that the designer designs a process model that includes a task 122. The task 122 may generally include virtually any task to be included in a process model, where such tasks may be performed by human and/or computer actors. For example, if the process model being constructed is associated with a supply chain management (SCM) application, then various types of associated tasks may be specified, including tasks performed by manufacturers, warehouses, wholesalers, or retailers.

In some cases, the task 122 may be part of a process model that involves interactions between services, where such services generally refer to a software application(s) having one or more specific functionalities that are exposed to other applications, often over a network (e.g., the Internet) by way of a service interface. For example, such services may provide virtually any functionality that may be provided by an application over a network, including, for instance, providing stock quotes, providing airline or other reservations, providing purchasing/invoicing functionalities, or providing some aspect of supply chain management or inventory control. Multiple ones of such services may interact with one another (even when each is implemented by a different business partner) according to the rules of one or more process models. For example, such collaborating services and process models may interact by exchanging messages in an automated manner, where the messages provide information about associated tasks and the respective status of each task. Many other examples of tasks and process models are known, including non-business examples such as those related to schools, churches, charities, hospitals, governments, or virtually any other person or organization.

Thus, depending on a nature of the task 122 and/or on a nature of the larger process model being designed, it may be anticipated (e.g., either by the designer or the suspend-resume logic 120) that an exception associated with the task 122 may occur during later execution of the process model by the orchestration engine 104. For example, and according to some of the examples just mentioned, the task 122 may include a messaging task in which the process model interacts with some business partner or other collaborator. Such messaging tasks may include, for example, either a sending of a message or a receiving of a message, the message(s) generally regarding a status or event associated with the process model. For example, the task 122 may include receipt of a message that informs the larger process model that a business partner has received shipment of a product at a warehouse, so that shipment of the product to the customer may proceed, and/or payment may be collected.

In these and other examples, the designer may be allowed to insert at least one suspension task, in parallel with the task 122 and forming a parallel combination thereof. In FIG. 1, the at least one suspension task may include, for example, one or more of the tasks 124, 126, 128, and 130. In particular, the task 124 includes an exception detection task 124 that allows the designer to designate possible events or causes that may be detected during run-time of the process model and that may be interpreted as triggering exceptions. The task 126 refers to an isolated task 126 that is triggered when the exception detection task 124 is completed. The isolated task 126 has a characteristic of continuing to completion once triggered, without permitting any interleaving with other tasks. In other words, the isolated task 126 may be considered to represent an atomic task that is configured to prevent execution of any other task that may occur before the isolated task 126 finishes.

In the example of FIG. 1, for example, if the isolated task 126 is triggered prior to a beginning of the task 122, then the isolated task 126 is configured to complete before the task 122 is allowed to begin. In FIG. 1, the isolated task 126 includes the task 128 as an exception outcome notification task 128, and the task 130 as an exception outcome action task 130. Therefore, since the isolated task 126 is configured to complete without any interleaving with other tasks, it may be seen that possible orders of execution of the tasks 122, 128, and 130 only include the possible sequences of: 122, 128, 130 or 128, 130, 122, but do not include the possible sequence of 128, 122, 130 (since this would mean that the task 122 is implemented in between the tasks 128 and 130, which is prevented by the configuration of the isolated task 126, as just described). Similar comments apply to other tasks that may precede or follow the task 122, not shown in FIG. 1 for clarity, but generally represented by the dashed lines before and after the task 122.

The effect of including the isolated task 126 in this manner, then, is to suspend the task 122. That is, when the task 128 is triggered before the task 122, and then the task 128 is paused for whatever reason or by whatever mechanism, then the isolated task 126 may not complete, and the task 122 may not begin. Consequently, the task 122 is effectively suspended. If the isolated task 126 completes (e.g., when the exception outcome action task 130 is triggered and completes), then the task 122 may begin, so that the task 122, and relevant portions of the larger process model, may resume execution.

In the example of FIG. 1, it should be understood that the exception detection task 124 may include more than one exception detection events, since more than one thing may go wrong during or before execution of the task 122. For example, the exception detection task 124 may include one or more of a receipt of an exception message or a timer. For example, if the exception detection task 124 and the task 122 are triggered at the same time, and the exception detection task 124 includes the starting of a timer for some associated time period, then it may occur that the time period expires before the task 122 begins. In this case, the exception detection task 124 triggers the isolated task 126, which then prevents a beginning/completion of the task 122, and initiates the exception outcome notification task 128.

For example, the larger process model may be associated with a manufacturing scenario, where the task 122 (and/or associated task) may be associated with manufacturing of a product to be transported to a warehouse for shipment to a customer. The exception detection task 124 may include a timer that requires that the product be manufactured (i.e., completed) within a week, on the assumption that the product may not be needed after this time period, or may be obtained from another source. If the manufacturing is not completed, and the timer expires, then detection of an exception is considered to have occurred by the exception detection task 124.

This would trigger the isolated task 126, where in this case the exception outcome notification task 128 may represent one or more tasks associated with a notification of an outcome of the exception(s). For example, the exception outcome notification task 128 may include one or more tasks that signify waiting for notification of resolution or outcome of the exception. For example, the exception outcome notification task 128 may include waiting for a receipt of a notification that the customer no longer wants the product being manufactured, or, conversely, may wait for a notification that the customer has indicated the ability to wait another three days.

The exception outcome action task 130 represents an action taken in response to the notification of the exception outcome notification task 128. In the two examples just given, the action may be either to abort the process, or, in the latter case, to re-set the timer for three days and loop back to a designated part of the process model to wait the designated three days. Other options include escalation of the exception for handling by a higher-level process.

Further examples and details are provide below, but the above example and FIG. 1 generally illustrate that the suspend-resume logic 120 may be used during design of a process model to define a first branch 132, also referred to as a process branch, and a second branch 134, also referred to as a suspension branch and/or suspension-resumption branch. As described, the suspension branch 134 may be designed during normal design of the larger process model, and may be activated during execution to control a desired suspension and resumption of at least a part of the process model (including the process branch 132) during execution thereof by the orchestration engine 104.

The process branch 132 and the suspension branch 134 are joined in parallel between a first control task 136 and a second control task 138 that act to enforce and support the behavior described above. In FIG. 1, the first control task includes an AND task 136 (also referred to as an AND-split task), while the second control task includes a synchronization/merge (synch/merge) task 138. As described in more detail below, the first control task 136 and second control task 138 may be inserted by the suspend-resume logic 120 as part of the process model design. For example, the designer may be in the process of designing the process model, and may decide that the task 122 requires the possibility of being suspended in response to an anticipated exception. The designer may then interact with the suspend-resume logic 120 to provide characteristics of the suspension branch 134, including, for example, exception detection events, exception outcome notifications, and/or exception outcome actions, as referenced above. Then, the suspend-resume logic 120 may insert the suspension branch 134, along with the control tasks 136, 138 at the beginning and end of the branches 132, 134, as shown, so as to establish a parallel combination thereof.

During later execution of the designed process model (e.g., of an instantiation thereof) by the orchestration engine 104, the AND task 136 will allow both or either branch(es) 132, 134 to activate and execute. If the process branch 132, including task 122, executes as planned, and completes (e.g., no error occurs), then the synch/merge task 138 simply merges the two branches 132, 134 and the process continues. If, however, the task 122 does not execute as planned, and the exception detection task 124 receives (detects) an exception, then the isolated task 126 is activated, and at that point the process branch 132 is not permitted to progress further (i.e., is suspended). Only when the exception outcome action task 130 is completed may the suspension branch 134 complete, which allows the synch/merge control task 138 to synchronize and merge the branches 132, 134 (unless otherwise directed, e.g., where the exception outcome action task 130 causes the entire process to abort).

Thus, the combination of control tasks including the AND task 136 and the synch/merge task 138 provides a combination of a simple synchronization (in which two or more tasks/branches are synchronized such that execution of following tasks may not proceed until all the preceding tasks are completed) and a merge (in which the process model waits for one task/branch among a set to complete before proceeding; in a pure merge, it is generally assumed that only one of these tasks will be executed). The resulting synchronization/merge provides a combination in which multiple tasks/branches are merged, such that multiple tasks/branches are synchronized if more than one of the tasks/branches are actually taken, and a simple merge is performed if only one of the tasks/branches is taken. In this way, for example, a deadlock situation is avoided, e.g., situations in which synchronization is impossible because the process branch 132 executes to completion but the suspension branch 134 is never activated.

Thus, in the example of FIG. 1, if the process branch 132 is activated, but not the suspension branch 134 (such as when the task 122 completes without incident), then a simple merge will occur when the process branch 132 completes. Likewise, if the suspension branch 134 is activated but not the process branch 132, then, again, the merging of both branches 132, 134 may occur. On the other hand, if both branches 132, 134 are activated, then synchronization will occur, so that the process model may not proceed from the second control task 138 until both branches 132, 134 are complete (i.e., until the exception has been resolved and the task 122 has been completed). Consequently, it may be seen that stopping the isolated task 126 (e.g., while waiting on the exception outcome action task 130) in the presence of the control tasks 136, 138 means that the task 122 (which can not be interleaved with the tasks 128, 130) must occur after the isolated task 126 but before synchronization, if the larger process model is ultimately to continue.

In operation, the suspend-resume logic 120 may be configured to perform a number of detailed operations related to the above techniques, and related techniques. For example, the suspend-resume logic 120 may include a task selector 140 that is configured to select the task 122, from among a number of tasks of the larger process model, as a likely or required candidate for requiring inclusion in the suspension block 112. Such selection may occur, for example, immediately upon insertion of a particular (type of) task within the process model being designed, or may occur after the entire process model is designed, as described in more detail below, with respect to FIGS. 3-4.

The suspend-resume logic 120 also may include a wizard generator 142 that executes an interactive wizard for eliciting information from the designer related to how the suspension branch 134 should be constructed and executed. For example, the wizard generator 142 may be configured to assist the designer in defining an exception event to be recognized by the exception detection task 124, or defining a notification for the exception outcome notification task 128, or defining an action/response for the exception outcome action task 130.

Finally, the suspend-resume logic 120 may include branch insertion logic 144 that is configured to determine where and how to insert the suspension branch 134 and/or the control tasks 136, 138. For example, as indicated by the dashed lines along the process branch 132, it may be the case that some, many, or no tasks may be included either before or after the task 122. A decision as to whether and which tasks should be included before or after the task 122 may be supported, at least in part, by the branch insertion logic 144. For example, the branch insertion logic 144 may determine that if the task 122 is a messaging task, then all non-messaging tasks occurring before and after the task 122 (up to but not including the nearest prior or subsequent messaging task) should be included in the process branch 132.

Additional example implementations and details are provided in more detail, below, with respect to FIGS. 2-8. In general, however, it should be understood from FIG. 1 that the process logic generator 118 provides for fast, intuitive design of a process model to capture and thus visualize suspend-resume operations, in a manner that anticipates exceptions and that is capable of suspending a designated module, portion, or block of the process model until the exception is resolved, and the process resumed. Accordingly, process models are able to provide more complete coverage of their relevant application domains.

Figure 2A:
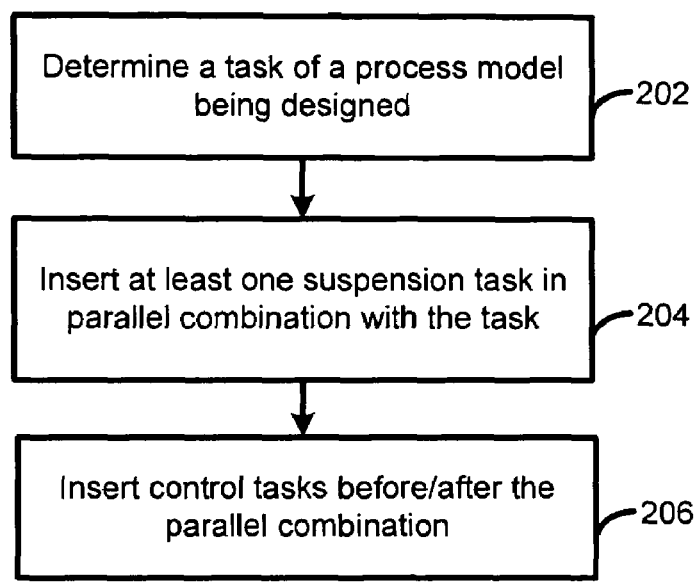
FIG. 2A is a flowchart illustrating example operations of the system of FIG. 1.

FIG. 2A is a flowchart 200a illustrating example operations of the system 100 of FIG. 1. In the example of FIG. 2A, design of a process model includes determining a task of a process model (202). For example, the task selector 140 may determine that a messaging task (e.g., the task 122) has been included in a process model being designed, and may automatically select that task as possibly being associated with an exception and possibly requiring inclusion in a suspension block such as the block 112. In other examples, the task selector 140 may simply receive a designation or selection of a task from the designer for inclusion in a suspension block.

At least one suspension task may be inserted in parallel combination with the task (204), such as when the suspension tasks 124, 126, 128, 130 are inserted in parallel combination with the task 122, as shown in FIG. 1. Of course, the task 122 may be in series or sequence with other tasks, so that the process branch 132 and the suspension branch 134 are defined, as referenced above and as illustrated in FIG. 1. The wizard generator 142 may be configured to assist in the insertion of the at least one suspension task, e.g., by receiving characteristics of the at least one suspension task from the designer, such as exception detection events, possible exception notification types, and possible exception outcome actions.

Control tasks may be inserted before and after the parallel combination (206), such as, for example, the control tasks 136, 138, which are illustrated as an AND and synch/merge construct. As described, such a construction allows for either or both of the branches 132, 134 to execute, while supporting and enforcing the suspension and resumption of the task 122 in the manner described above with respect to FIG. 1. The branch insertion logic 144 may be configured to automate the process(es) of inserting the control tasks 136, 138, e.g., by determining the point before and/or after the parallel combination at which the control tasks 136, 138 should be inserted. For example, the branch insertion logic 144 may automatically determine whether any other tasks prior to, or subsequent to, the task 122 should be included in between the control tasks 136, 138, and, if so, how many such tasks should be included.

Figure 2B:
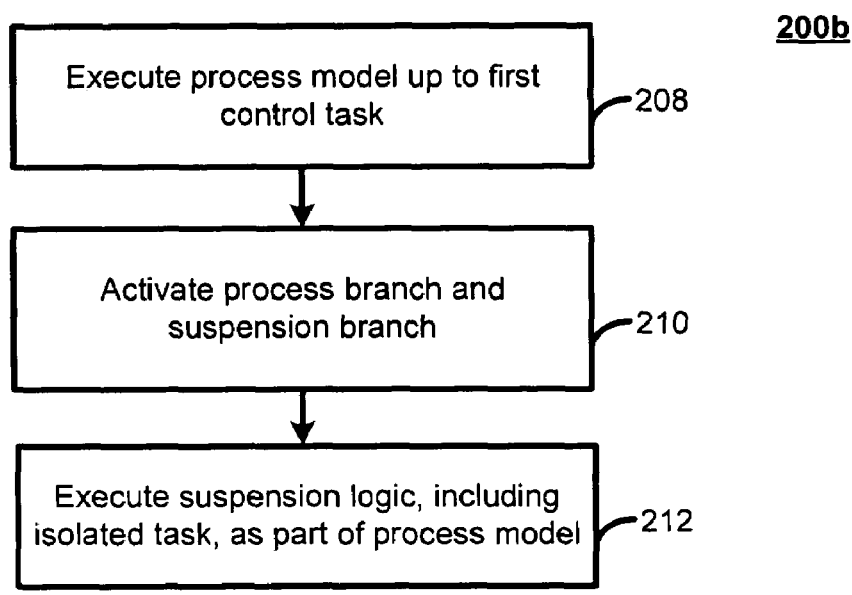
FIG. 2B is a flowchart illustrating example results of the operations of the system of FIG. 1.

FIG. 2B is a flowchart 200b illustrating example results of the operations of the system 100 of FIG. 1. That is, whereas the example of FIG. 2A discusses general design-time considerations related to the techniques of FIG. 1, FIG. 2B illustrates example run-time considerations that may occur during execution of the designed process model (i.e., of an instantiation thereof) by the orchestration engine 104.

In the example of FIG. 2B, the process model is executed up to the first control task (208). For example, tasks occurring before the control task 136 (not shown in FIG. 1, but described in more detail, below, with respect to FIG. 4) are executed as normal by the orchestration engine 104.

After the control task 136, the process branch 132 and the suspension branch 134 may be activated (210). For example, tasks prior to the task 122 may begin to execute, while the exception detection task 124 becomes capable of detecting an exception, should such an exception occur.

Then, the suspension logic of the suspension block 112, including use of the isolated task 126, may be executed as part of the process model (212). That is, as already described, the suspension block 112 allows the task 122 to proceed normally if no exception occurs, but suspends the task 122 upon the detection of an exception by the exception detection task 124 and upon subsequent activation of the isolated task 126. The suspension block 112 also allows the task 122 to resume and complete if the exception (and the isolated task 126) is resolved.

Figure 3:
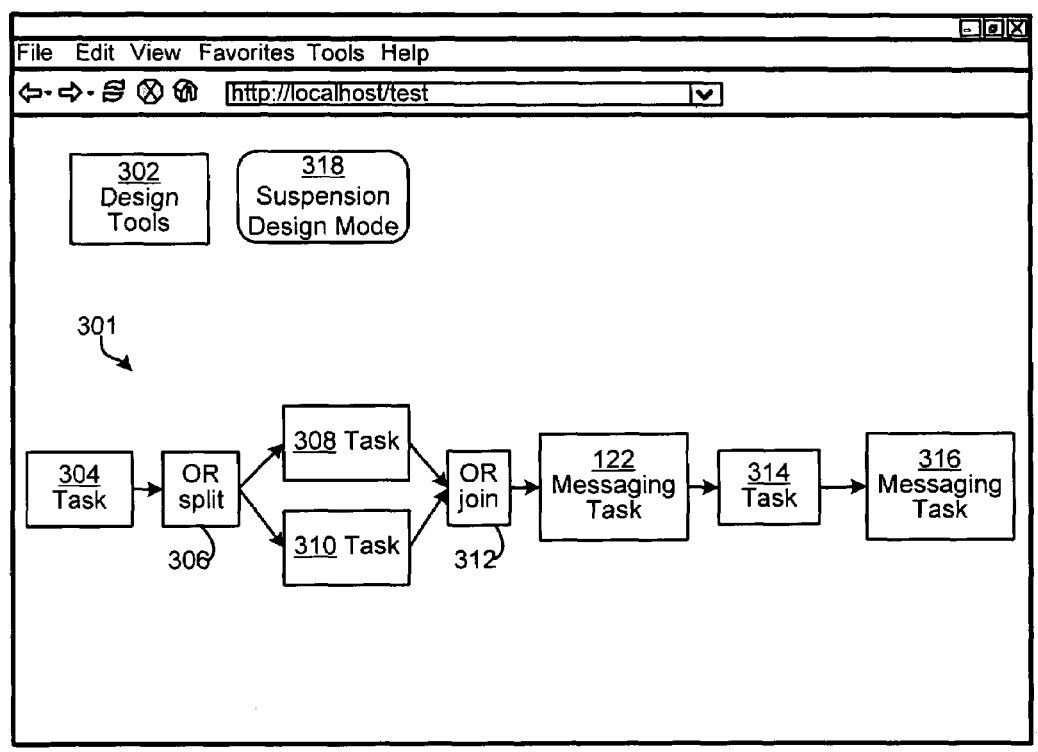
FIG. 3 is an example of a first screenshot used with the system of FIG. 1.

FIG. 3 is an example of a first screenshot 300 used with the system 100 of FIG. 1. In the example of FIG. 3, a process model 301 is illustrated that is being designed, or that has been designed, using design tools 302. In other words, the screenshot 300 illustrates an example in which the GUI generator 114 of FIG. 1 has generated the GUI of FIG. 3, and in which the design tool generator 116 has generated the design tools 302. As explained above, the design tools 302 may include any number of standard workflow design components, including, for example, blocks, templates, or pointers used in designing the process model 301. Of course, many other components of the GUI of the screenshot 300 may be used, such as components for initiating, ending, or saving the designed process model, or suggestions for how to construct a process model, or other conventional process model design tools/techniques.

The process model 301 is illustrated as including a number of illustrative tasks and control tasks 304-316. By way of example, it may be the case that the task 304 is associated with receiving an order from a customer, whereupon an OR split control task 306 provides for two possibilities of either receiving payment for the order (task 308) or applying credit from the customer's account to consummate the transaction (task 310). If either condition is met, then the OR join task 312 allows the process to continue, so that a message may be sent to a warehouse to fulfill the order (task 122). Once the order is fulfilled at the warehouse as part of the task 314, then the warehouse may return a message that is received at the messaging task 316.

In the example of FIG. 3, the designer has designed the process model 301, and wishes to provide for suspensions and resumptions of this process that may occur, perhaps in response to an error or other exception that is anticipated to occur. For example, the designer may be concerned that an error may occur with regard to the messaging task 122. For instance, the sending of the message of the messaging task 122 may be interrupted by a hardware or software failure, or an error may occur such that the recipient warehouse is designated incorrectly, so that the message is sent to the wrong location. Or, there may be some time period that is considered to be too long for the message to be sent, e.g., based on concern that the customer may wish to withdraw the order if not shipped promptly. Of course, many other exceptions may occur or be anticipated to occur.

Thus, the designer may select a suspension design mode selector 318, in order, for example, to initiate the process logic generator 118 and its suspend-resume logic 120. In FIG. 3, the suspension design mode selector 318 illustrates conceptually that the design of the process model 301 may include suspension (e.g., exception) design, by showing the suspension design as a separate mode of operation, which may be activated or de-activated as desired by the designer. Of course, suspension design also may be seamlessly integrated into the process model design; e.g., the suspend-resume logic 120 may automatically initiate at a beginning of a design session.

Figure 4:
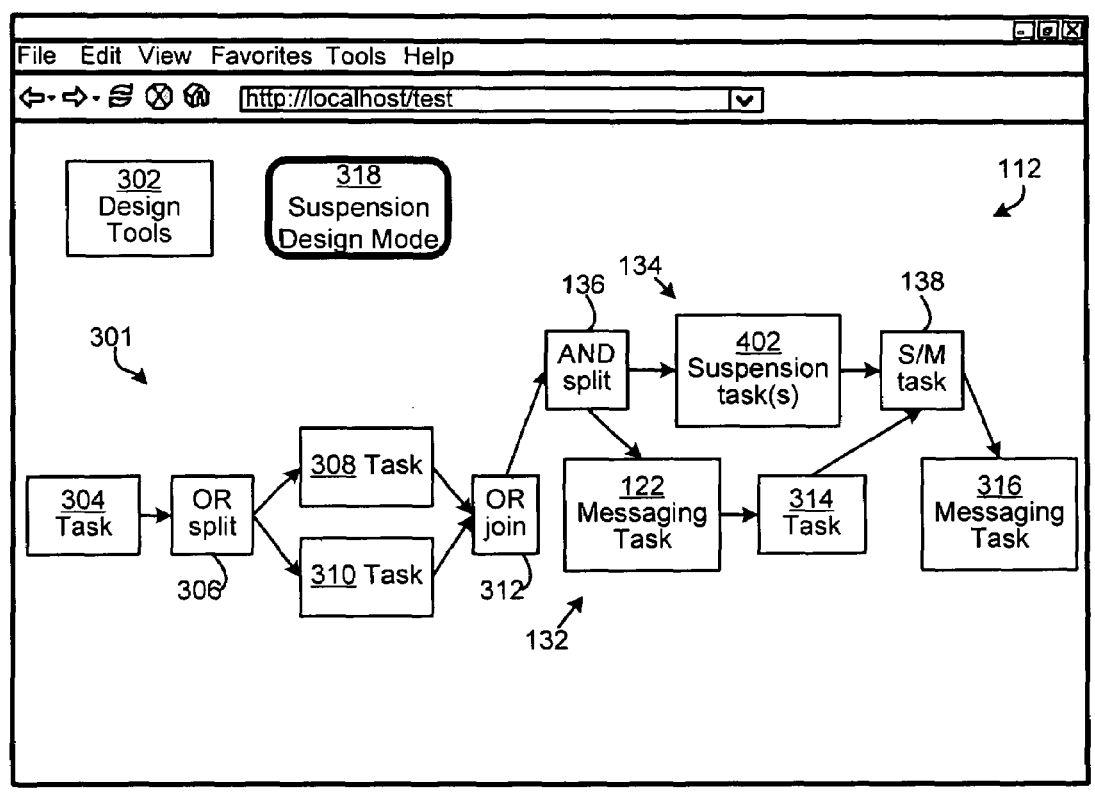
FIG. 4 is an example of a second screenshot used with the system of FIG. 1.

FIG. 4 is an example of a second screenshot 400 used with the system 100 of FIG. 1. In FIG. 4, the suspension design mode selector 318 has been activated, allowing the designer to design the suspension block 112, as shown. Specifically, in FIG. 4, the suspension block 112 within the process model 301 includes (at least one) suspension task(s) 402, joined in parallel with the sequence of the messaging task 122 and the task 314.

In other words, as shown, the process branch 132 of FIG. 1 is illustrated as including the messaging task 122 and the task 314, while the suspension branch 134 is illustrated as including the suspension task(s) 402 (which may include the tasks 124-130 of FIG. 1). The parallel branches 132, 134 are illustrated, as explained with respect to FIGS. 1 and 2, as being combined in parallel by the first control (AND) task 136 and the second control (synch/merge) task 138, as shown.

As will be apparent, the suspend-resume logic 120 may be configured to perform associated operations. For example, the task selector 140 may be involved in selecting the messaging task 122 as potentially being involved with an exception/suspension (for example, may highlight or otherwise visually indicate the task 122 as possibly requiring inclusion in the suspension block 112). The wizard generator 142 may be involved in defining the characteristics of the suspension task(s) 402 (as described in more detail below, with respect to FIGS. 5 and 6). Further, the branch insertion logic 144 may be involved with determining where and how to insert the suspension block 112 (for example, the branch insertion logic 144 may be involved in determining whether the task 314 should or should not be included in the process branch 132).

During operation, the designer may simply drag-and-drop, or otherwise designate, the various tasks 122 and 304-316 from the design tools 302. That is, the designer may select a generic element from the design tools 302, and, once inserted appropriately, may select the element and insert desired characteristics. Certain elements of the design tools 302 (e.g., messaging tasks) may be pre-designated by the task selector 140 as being potentially suitable for association with the need to be included in the suspension block 112.

As shown, the suspension block 112 has been inserted with respect to the messaging task 122. The branch selection logic 144 is illustrated as inserting the suspension branch 134 such that the (non-messaging) task 314 is included in the suspension block 112. In other words, all non-messaging tasks subsequent to the messaging task 122 are selected, up to but riot including the messaging task 316. Of course, many other rules may be created for operation of the branch insertion logic, and/or the designer may simply be requested to insert the suspension branch 134 in a desired area/configuration. In this way, the suspension block 112 may easily be constructed during design time, so that the process model 301 may be executed as normal by the orchestration engine 104 during run-time.

Figure 5A:
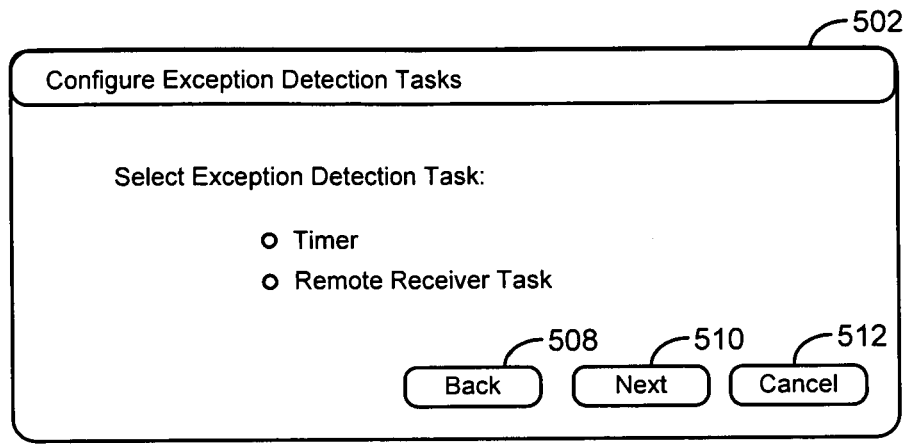
FIGS. 5A-5C are screenshots of a design wizard used with the screenshot of FIG. 4.
Figure 5B:
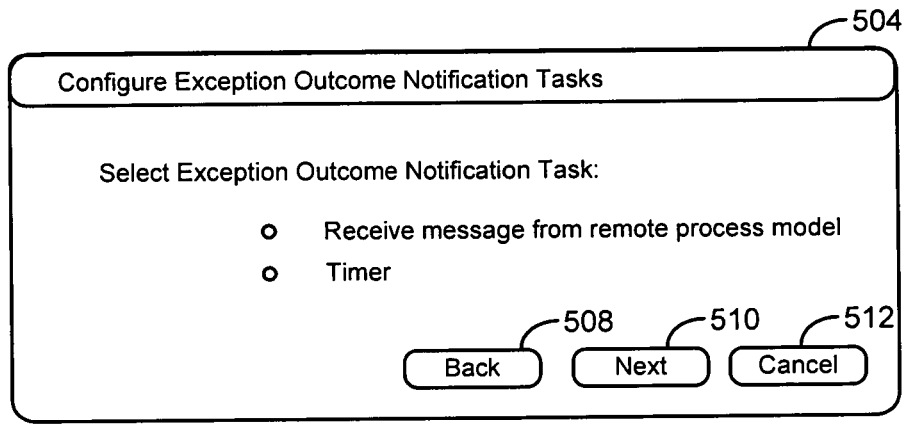
Figure 5C:
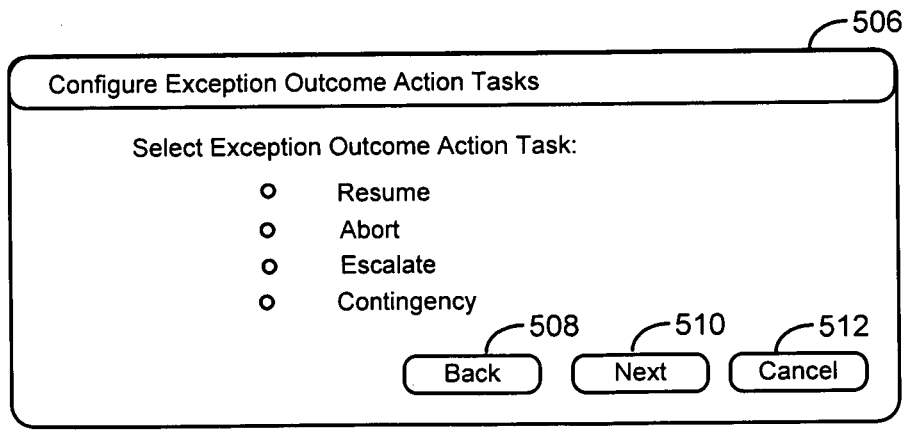

FIGS. 5A-5C are screenshots of a design wizard used with the screenshot of FIG. 4. Specifically, FIGS. 5A-5C provide an interactive way for the designer to enter characteristics of the suspension tasks 402.

FIG. 5A thus includes a first screenshot 502 that is designed to allow the designer to enter characteristics of the exception detection task 124. FIG. 5B includes a second screenshot 504 that is designed to allow the designer to enter characteristics of the exception outcome notification task 128. FIG. 5C includes a second screenshot 506 that is designed to allow the designer to enter characteristics of the exception outcome action task 130.

In FIG. 5A, the screenshot 502 may initially be presented to the designer after the designer (or the task selector 140) has selected the task 122 for inclusion in the suspension block 112. For example, the screenshot 502 may appear to the designer as a pop-up window above the screenshot 400 of FIG. 4. As shown, the screenshot 502 inquires of the designer as to whether the exception detection task 124 should include a timer or a remote receiver task (the latter being designed to receive a message indicating an exception in a remote process model, as referenced above and described in more detail below with reference to FIGS. 8A and 8B). It should be understood that the screenshot 502 may represent just the first screen in a series of screens of the interactive wizard for providing characteristics of the exception detection task 124, and that other choices besides the two just mentioned may be included.

For example, subsequent screens may depend on answers/information provided by the designer in previous screens, and may further refine selected characteristics. For example, if the designer selects that the exception detection task 124 should include a timer in the screenshot 502, then further screen(s) may be presented inquiring as to a duration or other characteristic of the timer.

It should be understood that since, for example, multiple exception detection tasks 124 may be included within the suspension block 112, the wizard may present the screenshot 502 (and associated screenshots) multiple times. Thus, the designer may select the same or different type of task (e.g., timer or remote receiver task, or other exception detection task), and provide different characteristics therefor, during several iterations of use of the screenshot 502.

As shown in the screenshot 502, navigation buttons 508 (back), 510 (next), and 512 (cancel) may be included to allow the designer to navigate among the various screenshots described herein. Of course, other navigation buttons or controls also may be provided, as would be apparent.

The screenshot 504 allows the designer to provide characteristics of the exception outcome notification task 128. For example, as shown, the exception outcome notification task 128 may include receiving a message from a remote process model that an exception has been resolved in a certain manner, or may again include a timer. The message from the remote process model may be further characterized, e.g., by queries of the wizard regarding the type of message or an identification of the remote process model(s) from which the message is expected. The timer may refer to a situation in which the suspension block 112 resumes or aborts after a certain amount of time, even if no explicit external notification is received (e.g., if most exceptions of a certain type are resolved (or deemed un-resolvable) after a given period of time, then that period of time may be set as the exception outcome notification).

As with the screenshot 502, the designer may select, during different iterations of the screenshot 504, any or all of the provided options, and may do so more than once. For example, the designer may designate a first remote receiver task (associated with receiving a first type of message) as a possible exception outcome notification, and then may designate a second remote receiver task (associated with receiving a second type of message) as a second possible exception outcome notification. At the same time, the designer may set a timer that provides notification of an exception outcome. Consequently, the resulting suspension block 112, once suspended, would wait for one of the designated messages from a designated remote process model(s), and if neither message is received after a defined time period, would resume operations anyway.

The screenshot 506 allows the designer to provide characteristics of the exception outcome action task 130. In the example of FIG. 5C, the designer may choose to resume or abort (e.g., to abort the process as a whole, or just to abort the suspension block and its associated task 122). The designer may choose to escalate the exception to a higher level of exception handling, or may designate a contingency task(s) that should be executed (e.g., when the exception outcome notification task 128 indicates that the task 122 will not be completed).

It should be understood that the screenshots 5A-5C are merely examples of portions of an example interactive wizard, and many other screenshots may be implemented to obtain the various features and advantages described herein, or other features and advantages. For example, the screenshot 504 may be associated with screenshots that allow the designer to tie a designated exception outcome notification task with a specific exception detection task. For example, if the exception detection task 124 includes a message from a remote process, then the exception outcome notification task 128 may include a corresponding message from the same process model, and these exception detection and exception outcome notification tasks may be tied together using the wizard. Similarly, in another example, the screenshot 506 may allow the designer to associate one or more specific exception outcome action tasks with one or more earlier exception outcome notification tasks.

As additional examples of un-illustrated screenshots, the wizard may include a screenshot prior to the screenshot 502, which initially asks whether the designer wishes to use the wizard at all (e.g., based on a selection of a task by the task selector 140 as possibly being included in the suspension block). At the end of the interactive design, the designer eventually may reach a screen having "done" or "submit" (or similar) as an option, which may be used to end the interactive design experience.

Figure 6:
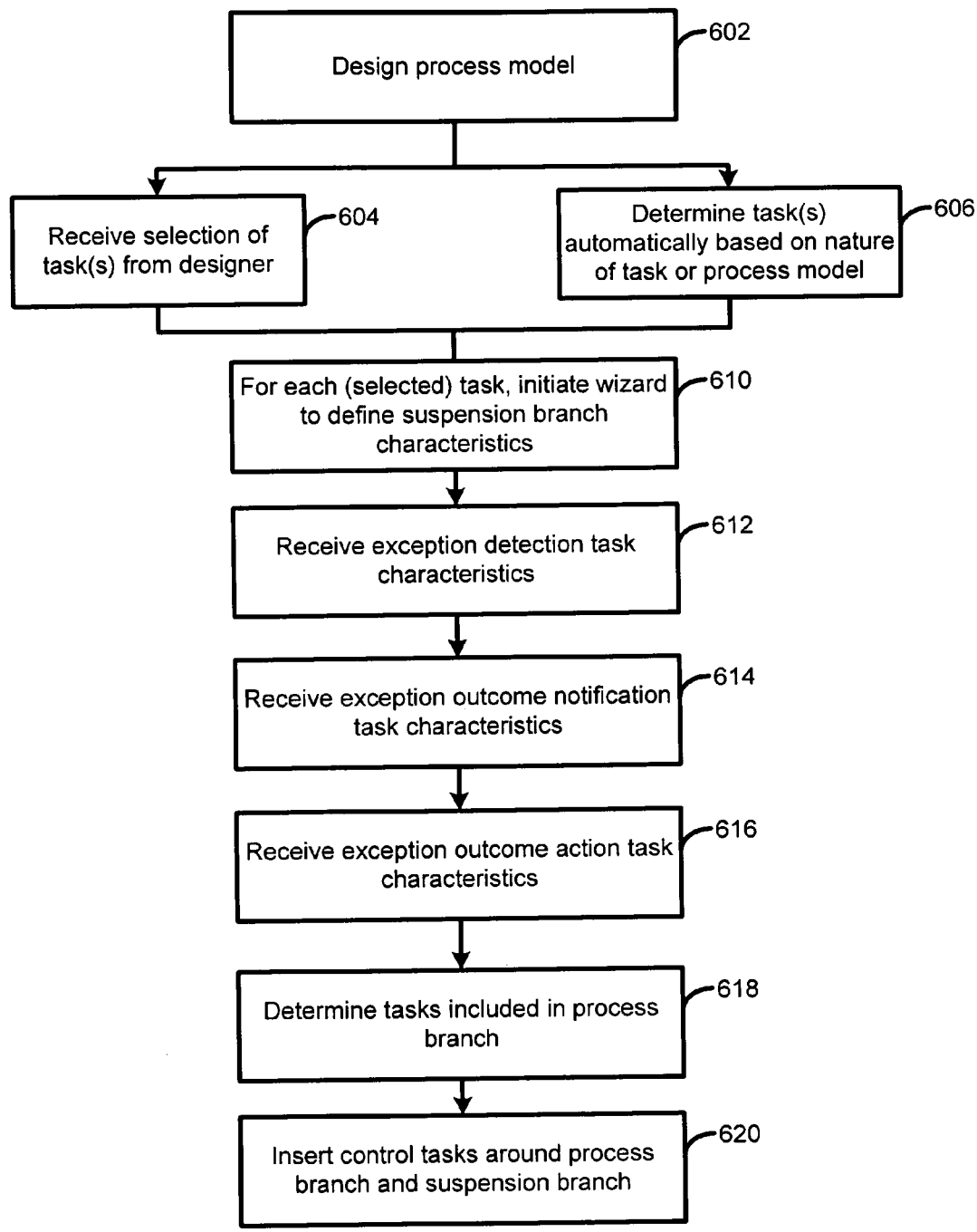
FIG. 6 is a first flowchart illustrating an operation of the system of FIG. 1 in the context of FIGS. 3, 4, and 5A-5C.

FIG. 6 is a first flowchart illustrating an operation of the system 100 of FIG. 1 in the context of FIGS. 3, 4, and 5A-5C. In FIG. 6, a process model is designed (602), and during the design, a selection of a task is received from the designer (604), and/or a task may be automatically selected, based on a nature of the task or the process model (606). For example, the designer may simply feel that an exception is potentially associated with a particular task, and may select (e.g., right-click on) the task and select the wizard of FIGS. 5A-5C. As another example, as soon as the designer inserts a particular type of task (e.g., a messaging task), the task selector 140 may recognize the task and may offer the option of using the wizard to design an associated suspension block. As yet another example, the designer may design the process model in its entirety, and then, once done, may enter the suspension design mode referenced above, so that the task selector 140 may select and designate some subset of tasks that (may) require or benefit from use of the wizard.

For each (selected) task, the wizard may then be activated to define suspension branch characteristics (610). For example, the wizard generator 142 may be activated to present the screenshot 502, or a previous screenshot, as referenced above. Accordingly, and as just described with respect to FIGS. 5A-5C, exception detection task characteristics may be received (612), exception outcome notification task characteristics may be received (614), and exception outcome action task characteristics may be received (616).

Then, tasks to be included in the process branch 132 may be determined (618). For example, the branch insertion logic 144 may select a number of tasks either before or after the task 122 that should be included (or excluded) from the process branch 132. For example, if the task 122 includes a messaging task, then the branch insertion logic 144 may insert the suspension branch 134 so as to include all non-messaging tasks occurring before and after the messaging task 122. In other example implementations, the branch insertion logic 144 may request or require input from the designer as to where to insert the suspension branch 134 (i.e., how many tasks should be included in the process branch 132 on either side of the selected task, e.g., the task 122).

Control tasks may then be inserted around the process branch 132 and the suspension branch 134. For example, the suspend-resume logic 120 may insert the AND task 136 and the synch/merge task 138 on either end of the branches 132, 134, so as to activate either or both branches 132, 134 and to subsequently join the branches 132, 134 during execution of the process model, as described above.

Figure 7:
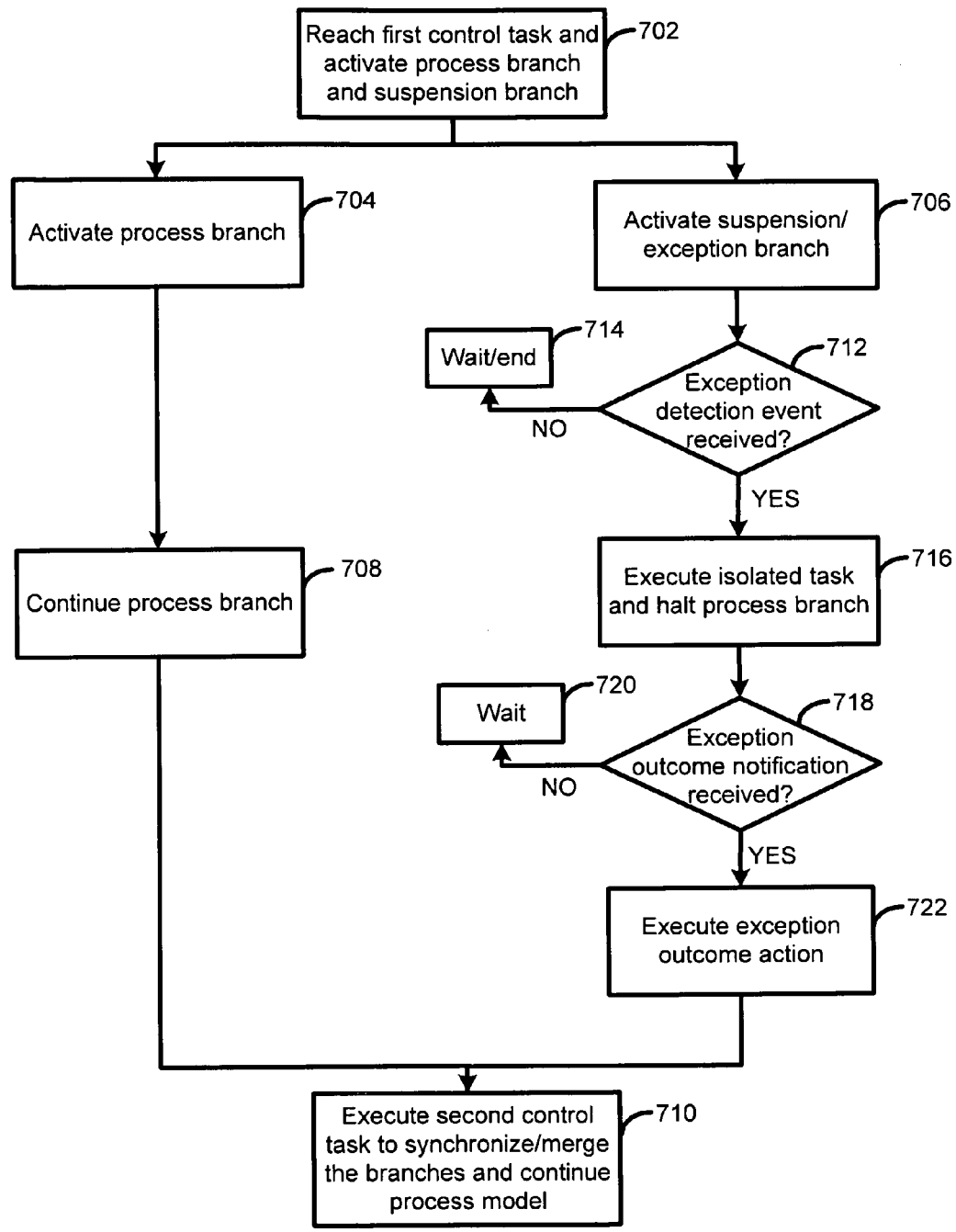
FIG. 7 is a second flowchart illustrating an operation of the system of FIG. 1 in the context of FIGS. 3, 4, and 5A-5C.

FIG. 7 is a second flowchart illustrating an operation of the system 100 of FIG. 1 in the context of FIGS. 3, 4, and 5A-5C. More specifically, whereas FIG. 6 illustrates a design-time of the system 100, FIG. 7 illustrates a run-time during which the orchestration engine 104 executes the designed process model.

In the example of FIG. 7, then, the orchestration engine 104 is in the process of executing (an instance of) a process model that has been designed as described, for example, by the processes and operations of FIG. 6. Accordingly, the orchestration engine 104 reaches the first control task 136 and activates the process branch 132 and the suspension branch 134 (702). For example, the orchestration engine 104 may activate the process branch 132 may allowing tasks thereof to continue as if no exception has occurred, or will occur (704), and may activate the suspension branch in the sense that the exception detection task 124 becomes capable of detecting an exception or exception-related event (706).

If no exception occurs, as would generally be hoped, then the orchestration engine 104 simply continues to execute the process branch (708), perhaps all the way to completion at the second control task (710), at which point the orchestration engine 104 would execute the synch/merge task 138 to merge the branches 132, 134 and continue on with the process model.

In this case, an exception detection event may never be received (712), so that the suspension branch 134 may simply wait for such an event, and, ultimately, may end as the process execution moves on past the second control task 138. On the other hand, if an exception detection event is received (712), then the orchestration engine 104 executes the isolated task 126, which, by its nature and as described above, serves to suspend the process branch (716). For example, if the task 122 has not yet started or has experienced an exception during execution thereof, and the isolated task 126 is triggered, then the task 122 may not complete until the isolated task 126 (including the exception outcome notification task 128 and the exception outcome action task 130) have completed.

Accordingly, the orchestration engine 104 causes the isolated task 126 to wait at the exception outcome notification task 128 until an exception outcome notification is received (718). If no such notification is received, then the orchestration engine 104 may simply wait (720). When the exception outcome notification is received (718), then the exception outcome action task 130 may be activated and the orchestration engine 104 may execute the exception outcome action (722), which again results in synchronization and merging of the process branch 132 and the suspension branch 134 (710).

Figure 8A:
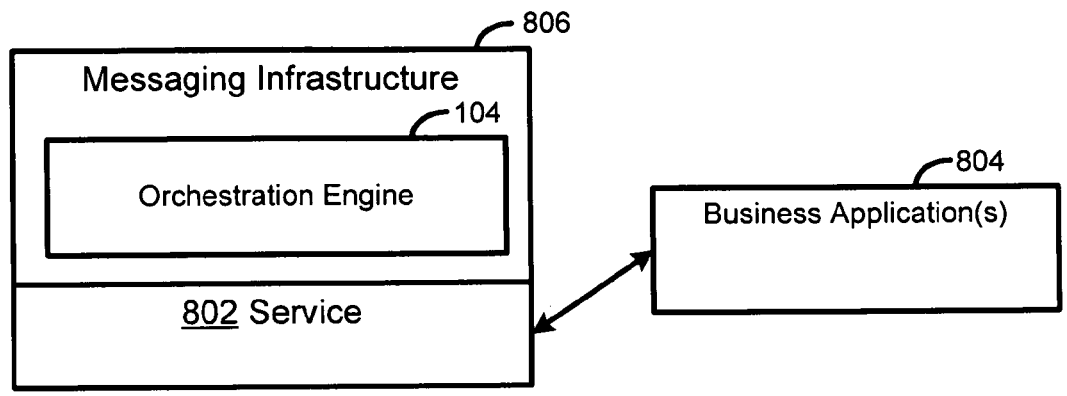
FIG. 8A is a block diagram of a system 800*a* for executing collaborative business processes, including remote exception handling.

FIG. 8A is a block diagram of an example system 800a for executing collaborative business processes, including remote exception handling. In FIG. 8A, it is assumed for example's sake that the system 800a is part of a collaborative business process in which multiple enterprises are running multiple respective process models, perhaps according to some global process model or choreography that serves as a pre-agreed contract as to how the various collaborating process models will interact.

As referenced above with respect to FIG. 1, the service 802 of FIG. 8A may be a service that generally implements and/or benefits from some type of coordination of messages in conjunction with providing its associated service functionality. An underlying business application 804 may implement various rules and business logic associated with the service 802. For example, the business application 804 may represent an equity analysis application, and the service 802 may interact with other services to obtain or exchange stock quotes or other equity-related information, and to perform analysis thereof. As another example, and as referenced above, the business application 804 may represent an SCM application, and the service 802 may be configured to expose information about the SCM business application 804 to other related applications (e.g., inventory levels, product shipment times, or other supply chain-relevant information). Thus, the service 802, in combination with corresponding services of other businesses and/or business applications, may be seen as part of a composite or aggregated service the provides for complex business interactions between a number of collaborating processes.

The messaging infrastructure 806 is thus configured to facilitate and enable messaging between the various processes, and, as shown, may implement the orchestration engine 104 as part of this functionality. Various known elements of the messaging infrastructure 806 are not illustrated in FIG. 8A, such as, for example, a message handler, a message log, and/or message repository. Messages may be implemented according to, for example, message types, message templates, previous messages, message portions that may be assembled into a single message, or other message-relevant information. For example, messages may be constructed using the extensible Mark-up Language (XML), according to message type/template information provided in corresponding XML schemas. Other non-illustrated elements of the messaging infrastructure may include, for example, a transaction resource engine configured to ensure that transactions between the service 802 and other services are maintained as part of the configured and instantiated version of the process model being executed, so that messages from/to the service 802 are matched and correlated with one another. For example, system and/or transaction identifiers may be included in (and/or added to) messages, as well as date/time stamps. Additionally, such transactional support of the orchestration engine 104 may be included in message control data (e.g., a header) for each message.

Figure 8B:
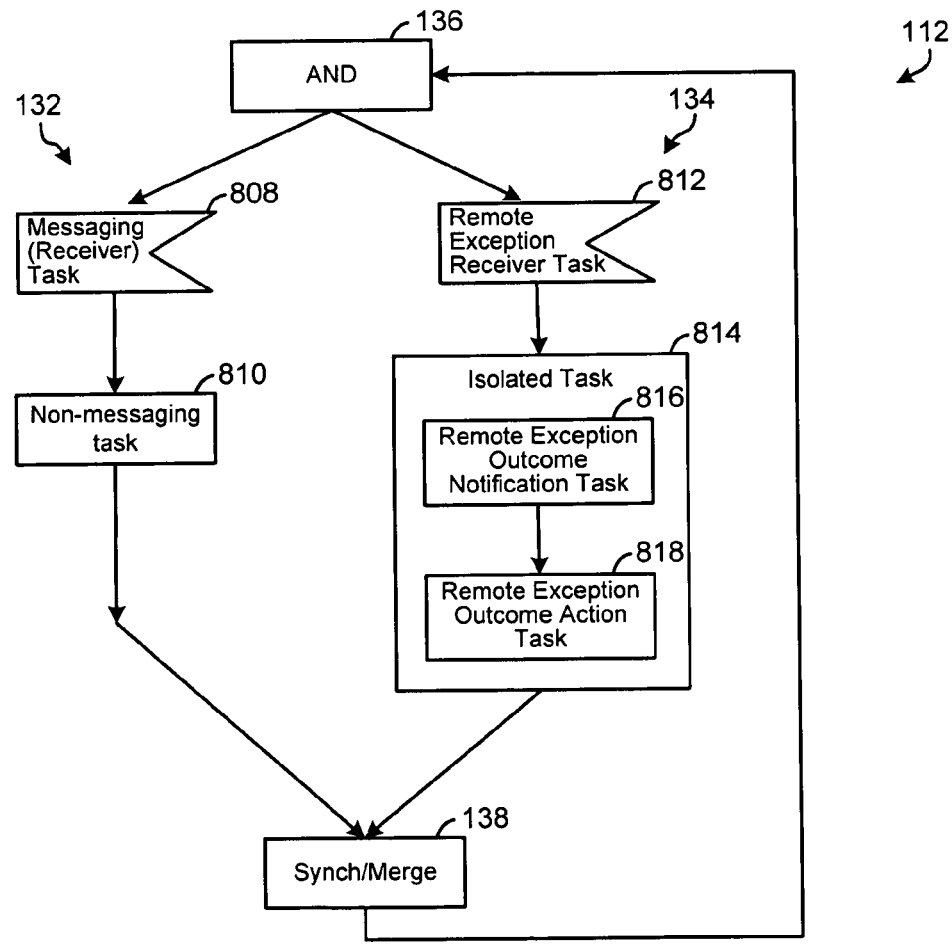
FIG. 8B is an example implementation of the system 100 of FIG. 1 in the context of the remote exception handling scenario of FIG. 8A.

FIG. 8B is an example implementation of the system 100 of FIG. 1 in the context of the remote exception handling scenario of FIG. 8A. That is, it should be understood from the above description that the service 802 may require numerous interactions with other executing process models. For example, certain business processes may be long-running (e.g., hours or days, or more), and some tasks should be completed before others begin. For example, the business application 804 may be associated with the manufacture of products, and may perform the manufacturing in dependence on an order received from a collaborating business process. If there is an error or problem or delay on the order side, then the manufacturing side may suffer. For example, in the worst case, the manufacturer may devote time and resources to manufacturing a product(s) that is not needed or wanted. However, even when there is only a delay in the demand for the product, the manufacturer may suffer inefficiencies in building something that is not yet needed, when those resources could have been devoted to more urgent needs.

Thus, the orchestration engine 104 and the messaging infrastructure 806, and their counterparts in corresponding remote process models, may be configured to escalate their local exceptions to remote processes that may be affected thereby. For example, in FIG. 8B, a process model of FIG. 8A may include a messaging task 808 that is illustrated as a receiver task (the indented side of the block 808 denoting that a message is to be received). For example, as just mentioned, a process model associated with a manufacturing process may receive messages regarding whether and how to proceed with the manufacturing process. Of course, the manufacturing process also may include many non-messaging, local tasks, represented by the non-messaging task 810, such as the local construction of a product for sale.

It will be appreciated that the process branch 132 of FIG. 8B may be designated and constructed as described herein, and, correspondingly, the suspension branch 134 may also be constructed as described herein. For example, the exception detection task 124 may be included as a remote exception receiver task (812), and may be configured and characterized to receive a message from a remote process model (e.g., from a messaging infrastructure thereof) as to an exception that occurs in the execution of the remote process model. For example, if the remote process model is associated with taking and processing orders for products to be manufactured, then the remote exception receiver task 812 may receive any one of a number of messages that provide some information about a corresponding exception that may have occurred (although only the single remote exception receiver task 812 is illustrated in the example of FIG. 8B), and that informs that the messaging task 808 will not, or may not, receive its expected message at the expected time.

Upon receipt of such an exception message, an isolated task 814 may be activated, so that a remote exception outcome notification task 816 is activated. The remote exception outcome notification task 816 waits for a second message from the remote process model that indicates an outcome of the exception. For example, the remote process model may send a follow-up message that says that a payment has been received (or, conversely, will not be received), or that some other problem with the order has been resolved (or, again conversely, will not be resolved). Until such a message is received, the orchestration engine 104 will not allow the messaging task 808 to execute (i.e., will enforce the property of the isolated task 814 that no tasks of the parallel branch may be interleaved with tasks of the isolated task 814). Consequently, the process branch will be suspended, and the manufacturing entity associated therewith may devote resources to other, more productive and efficient areas.

If and when such a message is received that provides the remote exception outcome notification, then a remote exception outcome action task 818 will be triggered. For example, any of the above exception outcome actions may be triggered, such as, for example, a resumption of the messaging task 808 and subsequent task 810, aborting of the messaging task 808, an escalation of the exception to a higher level, or an execution of some contingency (i.e., alternative) task. Then, the orchestration engine 104 may synchronize/merge the process branch 132 and suspension branch 134 as described herein.

Many other variations and implementations are contemplated. For example, it may occur that, as shown in FIG. 8B, the suspension block 112 may anticipate a loop-back operation in which allows for the overall suspension block 112 to be re-executed. For example, a remote exception outcome notification/action may include "problem continuing," or some other indication of a non-fatal problem that is on-going. In such cases, the suspension block 112 re-starts/re-activates the AND task 136, and tries again to execute through the process branch 132. In these case, it may be advantageous to deactivate the process branch 132 and cause it to be a dead branch for the synch/merge operation, so as to avoid having two active instances of the process branch 132 (e.g., upon re-starting of the AND task 136). In other implementations, if multiple instances are active, then identifiers may be used to differentiate.

In the examples described, it should be apparent that the suspension block 112 provides a modular, discrete way to implement process suspension/resumption. That is, processes at the level of decomposition of the suspension block 112 may be suspended and resumed, while other parts of the process model as a whole may be allowed to continue, as needed/possible. In some instances, a result may be that multiple suspension blocks 112 may exist within a single process model, and multiple parts of the process model may be suspended at the same time.

That is, for example, multiple remote exception messages may be received. It may occur that a second remote exception message is received, after a suspension has already occurred in response to a first remote exception message. In such cases, the second remote exception message may be buffered in the messaging infrastructure 806, until the first remote exception message is resolved. Of course, in the meantime, it may occur that the second remote exception is resolved before the associated buffered remote exception message is read, in which case the buffered remote exception message may be discarded.

The implementations described herein generally refer to whole systems for implementing the various techniques. However, it should be appreciated that various modular implementations may exist. For example, the process logic generator 118 and/or the suspend-resume logic 120 may be implemented as third-party components (e.g., constructed in XML) that are included in the process model designer 106 and/or the orchestration engine 104.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program described above, can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods may be performed by one or more programmable processors executing a computer program to perform functions by operating on input data and generating output. Methods also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least, one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Thus, while certain features of the described implementations have been illustrated as described herein, many modifications, substitutions, changes and equivalents will now occur to those skilled in the art. It is, therefore, to be understood that the appended claims are intended to cover all such modifications and changes.

What is claimed is:
1. A method comprising:
 determining a task of a process model, wherein the task is associated with a potential suspension;
 providing at least one suspension task in parallel with the task to form a parallel combination thereof within the process model, including
  providing the at least one suspension task within a suspension branch and including an exception outcome notification task that is configured to receive a notification that an exception has been resolved, providing the at least one suspension task within the suspension branch and including an exception outcome action task that is triggered by completion of the exception outcome notification task, and that is configured to perform an action based on the completion, including providing the exception outcome notification task and the exception outcome action task within an isolated task that is configured, once triggered, to execute to completion without interleaving with the task; and providing a first control task prior to the parallel combination and configured to activate the task and the at least one suspension task during execution of the process model, and a second control task subsequent to the parallel combination and configured to join results of the task and the at least one suspension task during execution of the process model, wherein the determining the task, the providing at least one suspension task, and the providing the first control task and the second control task include providing a graphical user interface for designing the process model; and providing at least one design tool for visually arranging elements of the process model, the elements including tasks, control tasks, and pointers.

2. The method of claim 1 wherein determining a task of a process model, the task associated with a potential suspension, comprises:

determining the potential suspension as being in response to an anticipated exception occurring during execution of the process model.

3. The method of claim 1 wherein determining a task of a process model, the task associated with a potential suspension, comprises:

receiving the task from a designer of the process model.

4. The method of claim 1 wherein determining a task of a process model, the task associated with a potential suspension, comprises:

determining the task based on a type or characteristic of the task.

5. The method of claim 1 wherein determining a task of a process model, the task associated with a potential suspension, comprises:

determining the task as including a messaging task with a secondary process model.

6. The method of claim 1 wherein determining a task of a process model, the task associated with a potential suspension, comprises:

determining the task as an event that is associated with execution of the process model.

7. The method of claim 1 wherein providing at least one suspension task in parallel with the task to form a parallel combination thereof within the process model comprises:

providing the at least one suspension task within a suspension branch and including an exception detection task configured to determine when an exception has occurred.

8. The method of claim 1 wherein providing a first control task prior to the parallel combination and configured to activate the task and the at least one suspension task during execution of the process model, and a second control task subsequent to the parallel combination and configured to join results of the task and the at least one suspension task during execution of the process model comprises:

providing the first control task Including an AND split task; and providing the second control task including a synchronization/merge task.

9. A system including computer-readable instructions stored on a computer-readable storage medium, the system comprising:

a process logic generator configured to provide a suspension block within a process model during a design of the process model, the suspension block including:

a first control task and a second control task; and a parallel combination of a process branch and a suspension branch between the first control task and the second control task, wherein the suspension branch includes an isolated task that is configured to activate during an execution of the process model in response to a detection of an exception in a process task of the process branch, and configured, once activated, to run to completion without permitting interleaving of the process tasks, wherein the isolated task includes an exception outcome notification task that is configured to receive a notification that an exception has been resolved, and further includes an exception outcome action task that is triggered by completion of the exception outcome notification task, and that is configured to perform an action based on the completion; and a graphical user interface (GUI) generator configured to provide a graphical user interface for designing the process model; and a design tool generator configured to provide at least one design tool for visually arranging elements of the process model during the design and using the graphical user interface, the elements including tasks, control tasks, and pointers.

10. The system of claim 9 wherein the process logic generator includes suspend-resume logic that comprises a task selector configured to select the process task from among tasks of the process model for inclusion within the suspension block.

11. The system of claim 9 wherein the process logic generator includes suspend-resume logic that comprises a wizard generator that is configured to generate an interactive wizard for receiving details from a designer of the process model, the details relating to the detection of the exception and a response thereto.

12. The system of claim 9 wherein the process logic generator includes suspend-resume logic that comprises branch insertion logic that is configured to insert the first control task, second control task, and suspension branch within the process model.

13. A system including computer-readable instructions stored on a computer-readable storage medium, the system comprising:

an orchestration engine configured to receive a process model by way of a graphical user interface used to design the process model and providing at least one design tool for visually arranging elements of the process model during the design, the elements including tasks, control tasks, and pointers, the orchestration engine being configured to execute the process model and being further configured to:

activate a first control task associated with a process branch and a suspension branch;

detect an exception at an exception detection task of the suspension branch;

activate an isolated task that is configured, once activated, to execute to completion without interleaving with a task of the process branch, wherein the isolated task includes an exception outcome notification task that is configured to receive a notification that an exception has been resolved, and further includes an exception outcome action task that is triggered by completion of the exception outcome notification task, and that is configured to perform an action based on the completion; and activate a second control task that is configured to synchronize and merge the process branch and the suspension branch, upon completion of the isolated task.

14. The system of claim 13 wherein the first control task includes an AND split task; and the second control task includes a synchronization/merge task.

15. The system of claim 14 wherein the process branch includes at least one task that includes a messaging task with a secondary process model.

* * * * *